3,455,830
CO-SULFUR CONDENSED PETROLEUM FRACTION AND A REACTIVE MONOMER COMPOSITION
Franklin I. L. Lawrence, Bradford, and Michael J. Pohorilla, Berwyn, Pa., assignors to Kendall Refining Company, a corporation of Pennsylvania
No Drawing. Continuation-in-part of application Ser. No. 221,884, Sept. 6, 1962. This application Dec. 19, 1966, Ser. No. 602,574
Int. Cl. C10m 1/38, 1/48
U.S. Cl. 252—48.6         6 Claims

ABSTRACT OF THE DISCLOSURE

A composition is provided by co-sulfur condensing a liquid petroleum fraction having a molecular weight in excess of 750, less than 50% aromatic carbon atoms and a bromine number less than 10, and a reactive monomer from the group consisting of unsaturated fats and oils and esters of unsaturated fatty acids with sulfur at a temperature in excess of about 350° F. to produce a final condensation product having a viscosity of at least 300 SUS at 210° F. and effective at a 10% concentration to increase the viscosity index of a 60 at 100 SUS base oil about ten viscosity index units greater than a like amount of the hydrocarbon starting material.

---

This invention relates to novel compositions of matter useful as viscosity index improving agents for lubricants and is a continuation-in-part of our co-pending application Ser. No. 221,884, filed Sept. 6, 1962, now abandoned. More particularly, the invention embraces novel compositions of matter produced by the reaction of a reactive monomeric compound and a hydrocarbon material with a sulfur-supplying reactant; and lubricants of improved viscosity index containing such novel compositions.

It is known to produce viscosity index improving agents by reacting hydrocarbons with sulfur or oxygen to produce condensation products of relatively high molecular weight. One such material may be produced by contacting a hydrocarbon starting material having a molecular weight in excess of about 500 while at a temperature of at least 400° F. with at least about 5% by weight of elemental sulfur for a time period requisite to produce a condensation product effective as a viscosity index improving agent. Such sulfur and oxygen condensed hydrocarbon viscosity index improving agents are satisfactory in many applications but in some environments may not be wholly comparable with commercially available materials useful for the same purpose. A proportion of the viscosity index improving ability of these sulfur and oxygen condensed hydrocarbon viscosity index improving agents is lost when modified with $P_2S_5$ better their oxidative stability. Alone they are subject to oxidative degeneration. Moreover, the production of such sulfur condensed hydrocarbon compositions is economically objectionable in some respects as requiring an excessive amount of sulfur.

It is, accordingly, one primary object of the present invention to provide viscosity index improving compositions derived from hydrocarbons, reactive monomers and sulfur which are comparable in function to commercially available viscosity index improving agents such as polybutenes and polymethacrylates.

Another object of this invention is to provide viscosity index improving compositions which have greater oxidative stability than sulfur and oxygen condensed hydrocarbon and are resistant to reduction of viscosity index upon addition of $P_2S_5$.

More specifically, it is an object of the invention to provide novel viscosity index improving agents by co-sulfur condensing a hydrocarbon and a reactive monomer.

The art has for some time recognized the utility of sulfurized fatty acid esters as lubricant additives for various purposes. Such sulfurized fatty acid additives are produced by the direct reaction between the ester and sulfur or a sulfur-supplying reagent in the absence of a hydrocarbon reactant. In U.S. Patent 2,246,282 there is described a process for producing extreme pressure additives for lubricant compositions which entails two essential steps, namely, (1) a first step in which a mixture of a "sulfur carrier" and a sulfurizing agent, such as free sulfur or sulfur chloride, is heated to a temperature in excess of 350° F. to effect an intermediate product, and (2) a second step in which the intermediate product of the first step, which is not satisfactory as an extreme pressure agent, is blended with an amount of from about 85% to about 97% by weight with an oil of lubricating viscosity and the blend so produced is heated with an additional quantity of free sulfur. The "sulfur carrier" employed in Step 1 may be a terpene, rosin, purified rosin, partially hydrogenated rosin, ester of rosin and hydrogenated rosin acids, fatty oils, lard oil, unsaturated hydrocarbons such as cracked oil or waxes, but preferably dehydrogenated oils and waxes which may be obtained by chlorination and dechlorination, and unsaturated oils made by the polymerization of hydrocarbon olefins such as ethylene, propylene and the butylenes, amylenes or copolymers thereof, and especially polymers of isobutylene. The composition produced by the two-step process of Patent 2,246,282, although useful as a lubricant for extreme pressure applications, is not significantly effective as a viscosity index improver and is corrosive to a copper strip in a conventional copper strip corrosion test.

In direct contrast with the teaching of Patent 2,246,282, it is an additional primary object of the present invention to provide a novel composition of matter which may be produced in a single step which is an effective viscosity index improver for lubricants and which is non-corrosive to a copper strip, by a novel method of co-sulfur condensing a hydrocarbon and a reactive monomer.

It is a more specific object of the invention to provide a novel viscosity index improving composition by the co-sulfur condensation of an unsaturated ester of a fatty acid and a raffinate fraction of a crude oil.

It is yet another specific object of the invention to provide lubricant compositions of improved viscosity index comprising the contemplated novel sulfur co-condensates.

It is an additional object of the invention to provide a method for co-sulfur condensing a hydrocarbon and an unsaturated fatty acid ester to produce a co-condensate useful as a viscosity index improving agent.

It is a more specific object of the invention to provide a method for producing sulfur condensed hydrocarbon materials effective as viscosity index improving agents in which the amount of sulfur required to provide the desired product is substantially reduced or minimized as compared with that requisite to produce a comparable product from sulfur and a hydrocarbon only.

There are provided by the present invention, novel compositions of matter produced by co-sulfur condensing a hydrocarbon starting material having an ebullioscopic molecular weight in excess of about 1000 and a reactive monomeric compound, preferably selected from the group consisting of unsaturated fats, and unsaturated fatty acid esters with sulfur at a temperature in excess of 350° F. for a time period requisite to produce a final co-condensation product having a viscosity of at least 300 SUS at 210° F., effective in a concentration of about 10% by weight to increase the viscosity index of a 60 at 100 SUS standard base oil derived from a paraffinic crude source at least about ten viscosity index units more than a like amount of the hydrocarbon starting material from which said co-condensation product is produced.

In this application the term "viscosity index improving agents" shall be used to include a viscosity index improvement beyond that normally attainable by sulfur condensing hydrocarbons in which no ester is employed as well as a viscosity index improvement equal to that attainable by sulfur condensing hydrocarbons in which no ester is employed but with a significantly lesser amount of sulfur and with marked improvement in oxidation stability over the simple hydrocarbon sulfur condensates.

There are further provided by this invention novel viscosity index improving compositions of matter produced by co-sulfur condensing a hydrocarbon starting material having an ebullioscopic molecular weight in excess of about 1000 and an ester of an unsaturated fatty acid with sulfur at a temperature in excess of about 350° F. for a time period requisite to produce a final co-condensed product having a viscosity of at least about 300 SUS at 210 F., effective in a concentration of about 10% by weight to increase the viscosity index of a 60 at 100 SUS standard base oil derived from a paraffinic crude source at least about ten viscosity index units more than a like amount of the hydrocarbon starting material from which said condensation product is produced.

The compositions of matter with which this invention is concerned are usually further characterized by a ring and ball softening point, measured by ASTM Method E 28–42T, of at least about 80° F. Certain compositions comprehended by this invention are characterized by a ring and ball softening point or a viscosity which is too low to permit effective measurement in accordance with the aforementioned procedure. All compositions embraced by the invention, however, are characterized by a viscosity of at least about 300 SUS at 210° F.

The hydrocarbon starting materials which are employed in the production of the viscosity index improving agents of this invention are liquid petroleum fractions having an average ebullioscopic molecular weight of at least about 1000. An optimum ebullioscopic molecular weight range is from about 1200 to about 1700.

The most appropriate starting materials for the production of the viscosity index improving agents contemplated by the invention take the form of suitable fractions of crude oils. Appropriate fractions derived from crude oils of any source, including Pennsylvania crude oils, Mid-Continent crude oils, West Coast crude oils, Canadian crude oils, and the like, can be employed. All types of crude oils, including paraffin base crude oils, asphalt base crude oils, and naphthenic crude oils provide suitable sources from which petroleum fractions useful in the production of the viscosity index improving agents of the invention can be derived.

With respect particularly to fractions derived from Pennsylvania crude oils, it is preferred that the hydrocarbon starting materials from which the viscosity index improving agents of this invention are produced to be characterized by a bromine number not in excess of 10.

It is additionally perferred that hydrocarbons which are utilized as starting materials for the production of the viscosity index improving agents of the invention contain more than about 2 naphthenic rings per molecule, which rings can be individually integrated with the paraffinic chain portion of the hydrocarbon molecules or condensed with aromatic rings and/or with other naphthenic ring systems. It is also preferred that the hydrocarbon starting materials contain an average of not more than about 50% aromatic carbon atoms. Hydrocarbons which contain an appreciable quantity of highly condensed ring systems, such as those hydrocarbons which are found in the phenol or furfural extracts of lubricating oils, are operable and are most appropriately employed as starting materials for the production of viscosity index improving agents for synthetic lubricating oil cmopositions such as the diester oils.

Additionally, it is preferred that the petroleum fractions which the viscosity index improving agents of the invention are produced from contain not more than about 10% of the wax-type materials. The wax content herein referred to is determinable by a procedure similar to that described under ASTM designation D–721–51T with the exception that methyl isobutyl ketone is employed to precipitate the wax, the sample size is reduced to 0.5 grams, and the determination is conducted at 0° F. While the starting materials which contain substantially more than 10% by weight of wax, as determined by this test, e.g., petrolatum which may reflect a wax content on the order of 40% by weight, can be employed in the production of the viscosity index improving agents of the invention, such materials are not preferred. Such materials can be best used by blending with more desirable starting materials, such as the preferred petroleum fractions above described, in proportions up to about 25% by weight of the total blend.

Normal or vacuum distillation residual stocks and analogous fractions of paraffin base crude oils, such as Pennsylvania crude oils, are highly appropriate starting materials for the production of the viscosity index improving agents employed in this invention. Hydrocarbons precipitated by conventional propane precipitation processes from such residual stocks are particularly suitable.

Further refinement of such propane precipitated, high molecular weight hydrocarbons, which include both light and heavy resin functions, by extraction with furfural or phenol in conventional manner, yields a raffinate from which viscosity index improving agents of maximum effectiveness are produced. Conventional solvent extraction processes are utilized to obtain such raffinates. Such processes are well known to the prior art and are described in detail, inter alia, in Industrial and Engineering Chemistry, 40, pages 220–227 (1948), and at pages 335–336 of "Chemical Refining of Petroleum" by V. A. Kalichevsky and B. A. Stagner, Reinhold Publishing Co., 1942. Generally, the degree of extraction should be such as to yield about a 70% to 85% raffnate. More drastic extraction, for example, to yield 50% to 60% raffinates, may be practiced to obtain still more desirable starting materials for the production of the viscosity index improving agents of the invention.

The most preferred starting material for the production of the viscosity index improving agents of this invention embraces a solvent extracted Pennsylvania crude oil fraction having a molecular weight of from about 1200 to about 1700, a bromine number of not more than about 4, which is substantially wax and asphalt free, which contains not more than about 5% by weight of hydrocarbon molecules containing more than 50% aromatic carbon atoms, and which consists primarily of hydrocarbon molecules containing an average of from about 2 to about 7 naphthenic rings.

The invention generically embraces reactive monomers from the group consisting of unsaturated fats and oils and esters of unsaturated fatty acids. Preferably, it contemplates the inclusion of unsaturated fatty acid esters such as diethylene glycol dioleate, lard oil, pentaerythritol dioleate, triethylene glycol dioleate, cotton seed oil, corn oil, soybean oil etc.

In the production of viscosity index improving compounds the invention embraces generically all esters of unsaturated fatty acids. More specifically, the esters contemplated include unsaturated fatty acid esters of monobasic acids, such as dilinolenyl oleate, unsaturated fatty acid esters of dibasic acids, such as dioleyl succinate and dierucyl maleate and dilinolyl maleate, glycol fatty acid esters such as diethylene glycol dioleate, triethylene glycol dioleate, triethylene glycol and tall oil fatty acid ester, and polyethylene glycol dioleates, and polyol esters of unsaturated fatty acids including lard oil, pentaerythritol oleate, trimethylolethane tall oil fatty acid triester, trimethylolpropane tall oil fatty acid triester, pentaerythritol tall oil fatty acid diester, pentaerythritol tall oil fatty acid tetraester, and N-methyl glucamine tall oil fatty acid ester.

Specific acids which may be employed in the production of the unsaturated fatty acid esters which are combined with propane precipitated resins to produce viscosity index improving co-condensates according to this invention include all organic acids containing from 3 to about 25 carbon atoms, which are aliphatic, straight and branched chain, substituted and unsubstituted, such as: oleic acid, tall oil fatty acid, succinic acid, and the like. The specific unsaturated fatty acid utilized does not constitute the essence of the invention.

Specific alcohols which may be employed in the production of the unsaturated fatty acid esters within this invention include all alcohols having more than 2 carbon atoms, both saturated and unsaturated, straight and branched chain, substituted and unsubstituted, such as: triethylene glycol, diethylene glycol, polyethylene glycol, linolenyl alcohol, oleyl alcohol, erucyl alcohol, trimethylolthane, trimethylolpropane, pentaerythritol, N-methyl glucamine.

Phenols are not contemplated with the exception of phenolic compounds which contain aliphatic hydroxyl groups.

The sulfur reactant employed may comprise elemental sulfur or sulfur chloride or such other sulfur-supplying reagent as may be effective.

The reactive monomer starting material is suitably employed in proportions of from about 1% to about 25% by weight on the weight of the hydrocarbon starting material, a preferred range being from about 4% to about 15% by weight of reactive monomer on the weight of hydrocarbon starting material.

The temperature is maintained in excess of about 350° F., preferably from about 350–550° F.

The co-condensation reaction by which the novel compositions of matter with which this invention is concerned are produced may be effected in any desired manner. By way of illustration, the co-condensation reaction may be effected in essentially a single step by mixing the desired hydrocarbon starting material, ester, and sulfur-supplying reagent in suitable proportions and heating the mixture at a temperature in excess of 350° F., preferably about 425° F. to 525° F., for a time period requisite to produce a co-condensation product having the desired ring and ball softening point or viscosity. Alternatively, the process may be effected in two steps. In such a two-step process, the reactive monomer is first reacted with sulfur at a temperature in excess of about 300° F., preferably at a temperature of 350–400° F., to effect reaction between the sulfur and the monomer. In the initial step, the temperature is preferably maintained at the minimum value requisite to effect reaction between the sulfur and the reactive sites on the monomer to preclude polymerization thereof. In some cases where reactive unsaturated fatty acid esters are employed, a small amount of polymerization inhibitor may be desirably employed. The product of the first step is then blended with the requisite proportion of the hydrocarbon starting material and the resulting mixture heated to a temperature in excess of 350° F., preferably at a temperature of about 425–525° F., in the presence of additional sulfur, to produce the final co-condensation product which is useful as an additive to improve the viscosity index of lubricants, reduce the sulfur requirements for production of a given viscosity index improvement and impart oxidation stability.

The viscosity index improving agents of this invention may be blended with lubricants in conventional proportions of from about 2.0 to about 15.0 parts by weight per part by weight of lubricant. The particular proportion of viscosity improving agent employed does not constitute the essence of the invention.

The invention contemplates the utilization of the viscosity index improving agents in conjunction with all types of lubricants, including lubricants derived from mineral oils, all of the various synthetic oils, such as di-2-ethylhexyl sebacate, bis-(2-ethyl-hexyl)-2-ethylhexyl phosphonate, silicone oils, and the like. It will be appreciated that the invention is not restricted with respect to the type of lubricant in conjunction with which the viscosity index improving agents contemplated are employed.

In order to substantially completely minimize corrosion problems, it is often desirable further to treat the sulfur condensed product of the invention. It is generally considered that even to the very limited extent that the untreated condensation products are corrosive, such characteristic is essentially attributable to the presence of residual sulfur compounds, such as hydrogen sulfide, reactive organic sulfides and polysulfides, mercaptans, and the like. Such residual sulfur compounds can be removed or rendered innocuous in various ways, two of which are described hereinafter.

A first method is generally chemical in its approach and entails the treatment of the condensate with an oxidizing agent, such as air or elemental oxygen, hydrogen peroxide, the various other inorganic peroxides, inorganic chlorates and perchlorates, such as sodium chlorate, potassium chlorate, sodium perchlorate, potassium perchlorate, chlorine dioxide, nitrogen dioxide, organic peroxides, such as benzoyl peroxide, ditertbutyl peroxide, and the like, and organic hydroperoxides, for example, cumene hydroperoxide, and tertiary butyl hydroperoxide. A second method is essentially physical in character and entails contacting the condensation product with an inert gas, normally as a sweep gas. A representative inert gas useful for this purpose is nitrogen.

EXAMPLE I

A. Preparation of hydrocarbon starting material

About 75,000 grams of a cylinder stock derived by distillation from paraffin base Pennsylvania crude oil and characterized by a boiling point in excess of about 850° F., a molecular weight of about 750, a viscosity at 210° F. of 225 SUS, an A.P.I. gravity of about 24.8, and a flash point (Cleveland Open Cup) of about 600° F. is mixed with propane heated to a temperature of about 190° F. and then cooled to a temperature of about 65° F. The cylinder stock-propane solution is thereafter transferred into a chilling tank wherein the pressure is reduced to an extent requisite to volatilize sufficient propane to lower the temperature of the solution to about −20° F. to about −50° F. Makeup propane is added during the chilling operation, such that the ratio of propane to cylinder stock is about 3 to 1 at the end of the chilling cycle. During the chilling cycle, petrolatum is precipitated from the solution. The chilled cylinder stock-propane solution containing precipitated petrolatum is transferred to a filter feed tank and thence passed through an appropriate filter to effect removal of the petrolatum from the chilled solution.

Propane is added to the filtrate in an amount sufficient to raise the propane-cylinder stock ratio to about 10 to 1 and the temperature of the solution so obtained is elevated to about 150° F. to 180° F. whereupon about 15,000 grams of high molecular weight viscous materials are precipitated. These viscous materials still contain some propane.

The material so obtained is then mixed at a temperature of about 130° F. to 135° F. with additional propane to increase the propane-oil ratio to about 20 to 1. The temperature of the resulting solution is lowered to about 100° F. whereupon about 6,000 grams of viscous hydrocarbons are precipitated. These materials, after removal of all residual propane, are designated as heavy resins and are characterized by a molecular weight of about 1400, a viscosity of about 4100 SUS 210° F., and a bromine number of 3.7.

The remaining oil-propane solution is heated to about 150° F. whereupon 8,000 grams of additional viscous hydrocarbons which are designated as light resins are precipitated. Any residual propane is removed in a flash chamber. These hydrocarbons are characterized by a molecular weight of about 1300, a viscosity of about 1150 SUS at 210° F., and a bromine number of about 4.0.

B. Preparation of viscosity index improving agent from diethyleneglycol dioleate About 100 grams of diethyleneglycol dioleate are reacted with elemental sulfur in an amount requisite to provide one equivalent of sulfur per equivalent of olefinic double bond present in said dioleate at a temperature of about 350–450° F. to produce an intermediate sulfur reaction product which is then blended with about 900 grams of light resin raffinate described in A above and about 295 grams of additional sulfur. The blend so produced is heated at a temperature of about 500° F. for a time period sufficient to produce a final co-condensate having a ring and ball softening point of about 257° F. This final product is blown with air to render it non-corrosive to a copper strip when tested in accordance with ASTM procedure D–130.

C. Preparation of viscosity index improving agent from lard oil

The process described in Section B of this example is repeated with the exception that lard oil is employed as a starting material in lieu of diethyleneglycol dioleate and the condensation is terminated when the co-condensate is characterized by a ring and ball softening point of 243° F.

D. Preparation of viscosity index improving agent from pentaerythritol dioleate

The procedure described in Section B of this example is repeated with the exception that pentaerythritol dioleate is employed in lieu of diethyleneglycol dioleate, and the co-condensation reaction is terminated when the co-condensate is characterized by a ring and ball softening point of 258° F.

LUBRICANTS CONTAINING THE VISCOSITY INDEX IMPROVING AGENTS PRODUCED AS DESCRIBED IN SECTIONS B, C AND D OF THIS EXAMPLE

The viscosity index improving agents produced in the manner described in Sections B, C and D of this example are blended in concentrations of 7% by weight and 10% by weight with a lubricating oil consisting of a mixture of 25% by weight of a 70 at 100 neutral stock and 75% by weight of a light neutral raffinate and the viscosity-temperature behavior of the resulting blend determined. A control test of like character is conducted with respect to a like amount of light resin raffinate described in I–A which was sulfur condensed in known manner. The results of these tests are reflected in Table 1. ASTM Slope referred to in Table 1 and subsequent tables is also a measure of viscosity temperature properties of a fluid and is calculated as described by E. E. Klans and M. R. Fenske in ASTM Bulletin No. 215, pp. 87–94 (1956).

EXAMPLE II

This example illustrates the preparation of a viscosity index improving agent of the type contemplated by this invention in a single step process. 75 parts by weight of light resin raffinate described in Example I–A and 25 parts by weight of lard oil are blended with 30.5 parts by weight of elemental sulfur. The mixture is heated at a temperature of about 500° F. for a period sufficient to produce a co-condensate having a ring and ball softening point of about 240° F. The product so produced is blended in the proportion of about 10% by weight with a 60 at 100 neutral oil. The blend is characterized by a viscosity at 100° F. of 147 SUS, a viscosity at 210° F. of 49 SUS and a viscosity index of 165. The 60 at 100 neutral oil employed is derived from a Pennsylvania base crude oil by redistillation of a wide boiling primary distillate which has undergone chilling to remove wax.

In a comparative experiment it was determined that lard oil alone requires 30% sulfur to produce a reaction product having a ring and ball softening point of 72° F., and that such reaction product is incompatible with the 60 at 100 neutral oil employed in this example.

EXAMPLE III

A. Preparation of a viscosity index improving agent from dimethylamyl maleate

The procedure described in Example I–B is repeated with dimethylamyl maleate in lieu of diethyleneglycol dioleate and the co-condensation terminated when the co-condensate is characterized by a ring and ball softening point of 254° F.

B. Preparation of a viscosity index improving agent from diallyl maleate

The procedure described in Example I–B is repeated with diallyl maleate in lieu of diethyleneglycol dioleate and the co-condensation terminated when the co-condensate is characterized by a ring and ball softening point of 256° F.

C. Preparation of a viscosity index improving agent from dibutyl fumarate

The procedure described in Example I–B is repeated with dibutyl fumarate in lieu of diethyleneglycol dioleate and the co-condensation terminated when the co-condensate is characterized by a ring and ball softening point of 255° F.

D. Preparation of a viscosity index improving agent from diallyl itaconate

The procedure described in Example I–B is repeated with diallyl itaconate in lieu of diethyleneglycol dioleate and the co-condensation terminated when the co-condensate is characterized by a ring and ball softening point of 252° F.

LUBRICANTS CONTAINING THE VISCOSITY INDEX IMPROVING AGENT PRODUCED AS DESCRIBED IN SECTIONS A, B, C, D AND E OF THIS EXAMPLE

The viscosity index improving agents produced in the manner described in Sections A through E of this example are blended in concentrations of 7% by weight and 10% by weight with a lubricating oil consisting of a

TABLE I.—VISCOSITY-TEMPERATURE BEHAVIOR UNSATURATED FATTY ACID ESTERS

| Co-Condensing Agent | R&B (° F.) | 7% Concentration | | | 10% Concentration | | |
| --- | --- | --- | --- | --- | --- | --- | --- |
| | | Vis. at 210° F. | V.I. | ASTM Slope | Vis. at 210° F. | V.I. | ASTM Slope |
| None | 252 | 46.5 | 142.5 | .663 | 53.3 | 143.5 | .626 |
| Diethylene Glycol Dioleate | 257 | 46.3 | 145.8 | .657 | 52.7 | 146.6 | .613 |
| Lard Oil | 243 | 48.8 | 150.0 | .632 | 57.9 | 149.2 | .582 |
| Pentaerythritol Dioleate | 258 | 49.3 | 151.0 | .625 | 58.4 | 150.0 | .576 | mixture of 25% by weight of a 70 at 100° neutral stock and 75% by weight of a light neutral raffinate and the viscosity-temperature behavior of the resulting blend determined. Esters of unsaturated dibasic acids also reduce the quantity of sulfur required to achieve a given level of condensation. A control test of like character is conducted with a like amount of light resin described in I-A which was sulfur condensed in known manner. The results are set out in Table 2.

(2) The foregoing co-condensation was repeated using 50 grams of pentaerythritol dioleate.

B. Preparation of a viscosity index improving agent from diallyl maleate

About 100 grams of diallyl maleate was admixed with 900 grams of Bright Stock above described and condensed in the presence of one mole of sulfur per mole of diallyl maleate rather than pre-reacting the maleate and

TABLE II.—VISCOSITY-TEMPERATURE BEHAVIOR ESTERS OF UNSATURATED DIBASIC ACIDS

| Co-Condensing Agent | Percent Sulfur Consumed | R&B (° F.) | 7% Concentration | | | 10% Concentration | | |
|---|---|---|---|---|---|---|---|---|
| | | | Vis. at 210° F. | V.I. | ASTM Slope | Vis. at 210° F. | V.I. | ASTM Slope |
| None | 27.4 | 252 | 46.5 | 142.5 | .663 | 53.3 | 143.5 | .622 |
| Dimethylamyl Maleate | 25.6 | 254 | 46.2 | 141.9 | .667 | 53.0 | 142.8 | .626 |
| Diallyl Maleate | 23.5 | 256 | 45.9 | 143.2 | .668 | 51.8 | 143.5 | .631 |
| Dibutyl Fumarate | 26.3 | 255 | 46.7 | 144.4 | .660 | 53.3 | 144.4 | .619 |
| Diallyl Itaconate | 25.1 | 252 | 44.3 | 137.8 | .689 | 48.7 | 139.9 | .658 |

EXAMPLE IV

A solvent refined Bright Stock raffinate from paraffin base Pennsylvania crude oil having a molecular weight of about 750 and a viscosity of about 140 SUS at 210° F. was taken as a starting material.

A. Preparation of a viscosity index improving agent from pentaerythritol dioleate (1) About 100 grams of pentaerythritol dioleate are reacted with one mole equivalent of elemental sulfur at a temperature of about 350° F. and then blended with about 900 grams of the solvent refined Bright Stock above described. The blend is heated at a temperature of about 350° F. for a time sufficient to produce a final co-condensate having a ring and ball softening point of about 251° F.

sulfur. The co-condensation was terminated when the co-condensate reached a ring and ball softening point of 248° F.

LUBRICANTS CONTAINING THE VISCOSITY INDEX IMPROVING AGENTS AS DESCRIBED IN SECTIONS A AND B OF THIS EXAMPLE

The viscosity index improving agents described in sections A and B of this example are blended in a lubricating oil consisting of a mixture of 3 parts of a solvent refined neutral having a viscosity of 90 SUS at 100° F. and 1 part of 70 at 100° neutral stock and the viscosity temperature behavior of the blend determined along with a control consisting of a like amount of Bright Stock raffinate which was sulfur condensed in known manner. The test data appear in Table III.

TABLE III.—SULFUR-CO-CONDENSATION OF BRIGHT STOCK RAFFINATE
[10% concentration]

| Co-Condensation Agent | R&B (° F.) | Viscosity (SUS) | | Viscosity Index | ASTM Slope |
|---|---|---|---|---|---|
| | | 100° F. | 210° F. | | |
| None | 249 | 145.0 | 44.3 | 126.5 | .713 |
| 10% Pentaerythritol Dioleate | 251 | 201.7 | 46.6 | 98.6 | .749 |
| 5% Pentaerythritol Dioleate | 251 | 165.3 | 46.4 | 129.5 | .693 |
| 10% Diallyl Maleate | 248 | 171.0 | 47.3 | 133.2 | .682 |

EXAMPLE V

A solvent refined Bright Stock raffinate from asphalt base Mid-Continent Crude having a molecular weight of about 700 and a viscosity of about 145 SUS at 210° F. was taken as a starting material.

A. Preparation of a viscosity index improving agent from pentaerythritol dioleate The procedure of Example IV-A(1) was followed using 990 grams of Bright Stock raffinate and 10 grams of pentaerythritol dioleate. The co-condensation reaction was terminated upon reaching a ring and ball softening point of 268° F.

LUBRICANT CONTAINING THE VISCOSITY INDEX IMPROVING AGENTS DESCRIBED IN SECTION A OF THIS EXAMPLE

The viscosity index improving agents of section A of this example are blended in a lubricating oil consisting of 1 part of 70 at 100° neutral stock and 3 parts of a solvent refined neutral having a viscosity of 90 SUS at 100° F. The viscosity temperature behavior of the blend is determined along with a control consisting of a like amount of the base Bright Stock raffinate which was sulfur condensed in known manner. The test data appear in Table IV.

TABLE IV.—SULFUR CO-CONDENSATION OF MID-CONTINENT BRIGHT STOCK
[10% concentration]

| Co-Condensation Agent | R&B (° F.) | Viscosity (SUS) | | Viscosity Index | ASTM Slope |
|---|---|---|---|---|---|
| | | 100° F. | 210° F. | | |
| None | 254 | 135.5 | 43.2 | 122.3 | .723 |
| 1.0% Pentaerythritol Dioleate | 268 | 15.05 | 44.8 | 126.8 | .709 |

Conventional sulfur condensed resins have, in the past, been modified with $P_2S_5$ to better their oxidation stability. This treatment has generally degraded their viscosity index improved properties. The co-condensation viscosity index improving agents of this invention markedly reduces this degradation as will be seen from the comparative data appearing in Table V.

TABLE V.—SULFUR CO-CONDENSED LIGHT RESIN RAFFINATE MODIFIED WITH 3% $P_2S_5$

[10% concentration]

| V.I. Improver | R&B (° F.) | Viscosity (SUS) 100° F. | Viscosity (SUS) 210° F. | Viscosity Index | ASTM Slope |
|---|---|---|---|---|---|
| Sulfur Condensate | 252 | 212.4 | 53.4 | 143.5 | .622 |
| Sulfur+3% $P_2S_5$ Condensate | 240 | 159.3 | 46.6 | 136.8 | .676 |
| Sulfur+3% $P_2S_5$ Co-Condensed with 10% Pentaerythriotl Dioleate | 244 | 173.5 | 49.0 | 144.5 | .646 |

EXAMPLE VI

The conventional sulfur condensed viscosity index improving agents are known to be susceptible to viscosity increase and sludge formation in an oxidizing environment. In order to determine the effectiveness of the viscosity index improvers of this invention in inhibiting oxidation or improving oxidation stabilty, the co-condensates of (pentaerythrtol dioleate) and I–B triethylene glycol dioleate were tested in the absence of oxidation inhibitors by blending 8% by weight in a solvent refined neutral having a viscosity at 100° F. of about 140 SUS. The tests were conducted in a laboratory cycling test at a temperature of 300° F. This test is described by W. Hart and M. J. Pohorilla in ASTM Bulletin 234, p. 45 (1958). The results are detailed in Table VI.

TABLE VI.—CO-CONDENSATE

| Addition Agent | Hours to 20% Increase in SUS Viscosity at 210° F. |
|---|---|
| None | 208 |
| Triethyleneglycol Dioleate | 340 |
| Pentaerythritol Dioleate | 350 |

It will be seen from the foregoing table that marked improvement in oxidation stability can be achieved by the viscosity index improvers of this invention.

While we have described certain preferred embodiments and practices of this invention, it will be understood that the invtntion may be otherwise embodied within the scope of the following claims.

We claim:

1. A composition of matter produced by co-sulfur condensing a liquid petroleum fraction having an ebullioscopic molecular weight in excess of about 750, less than 50% aromatic carbon atoms and a bromine number less than 10, and a reactive monomer from the group consisting of unsaturated fats and oils and esters of unsaturated fatty acids with sulfur at a temperature in excess of about 350° F., but below the temperature of decomposition for a time period requisite to produce a final co-condensed product having a viscosity of at least about 300 SUS at 210° F., effective in a concentration of about 10% by weight to increase the viscosity index of a 60 at 100 SUS standard base oil derived from a paraffinic crude source at least about ten viscosity index units greater than a like amount of the hydrocarbon starting material from which said condensation product is produced, and at least five viscosity index units greater than an equal amount of condensation product derived by sulfur condensing the hydrocarbon starting material alone.

2. A composition of matter produced by co-sulfur condensing a liquid petroleum fraction hydrocarbon starting material having an ebullioscopic molecular weight in excess of about 750, less than 50% aromatic carbon atoms and a bromine number less than 10, and an ester of unsaturated fatty acid having free reactive sites with sulfur at a temperature in excess of about 350° F. but below the temperature of decomposition for a time period requisite to produce a final co-condensed product having a viscosity of at least about 300 SUS at 210° F., effective in a concentration of about 10% by weight to increase the viscosity index of a 60 at 100 SUS standard base oil derived from a paraffinic crude source at least about ten viscosity index units greater than a like amount of the hydrocarbon starting material from which said condensation product is produced, and at least five viscosity index units greater than an equal amount of condensation product derived by sulfur condensing the hydrocarbon starting material alone.

3. A composition of matter produced by co-sulfur condensing a liquid petroleum fraction having an ebullioscopic molecular weight in excess of about 750, less than 50% aromatic carbon atoms and a bromine number less than 10, and a reactive monomer from the group consisting of unsaturated natural oils and fats with sulfur at a temperature in excess of about 350° F. but below the temperature of decomposition for a time period requisite to produce a final co-condensed product having a viscosity of at least about 300 SUS at 210° F., effective in a concentration of about 10% by weight to increase the viscosity index of a 50 at 100 SUS standard base oil derived from a paraffinic crude source at least about ten viscosity index units greater than a like amount of the hydrocarbon starting material from which said condensation product is produced, and at least five viscosity index units greater than an equal amount of condensation product derived by sulfur condensing the hydrocarbon starting material alone.

4. A composition of matter produced by co-sulfur condensing a liquid petroleum fraction having an ebullioscopic molecular weight in excess of about 750, less than 50% aromatic carbon atoms and a bromine number less than 10, and diethylene glycol dioleate with sulfur at a temperature in excess of about 350° F. but below the temperature of decomposition for a time period requisite to produce a final co-condensed product having a viscosity of at least about 300 SUS at 210° F., effective in a concentration of about 10% by weight to increase the viscosity index of a 60 at 100 SUS standard base oil derived from a paraffinic crude source at least about ten viscosity index units greater than a like amount of the hydrocarbon starting material from which said condensation product is produced, and at least five viscosity index units greater than an equal amount of condensation product derived by sulfur condensing the hydrocarbon starting material alone.

5. A composition of matter produced by co-sulfur condensing a liquid petroleum fraction having an ebullioscopic molecular weight in excess of about 750, less than 50% aromatic carbon atoms and a bromine number less than 10 and lard oil with sulfur at a temperature in excess of about 350° F. but below the temperature of decomposition for a time period requisite to produce a final co-condensed product having a viscosity of at least about 300 SUS at 210° F., effective in a concentration of about 10% by weight to increase the viscosity index of a 60 at 100 SUS standard base oil derived from a paraffinic crude source at least about ten viscosity index units greater than a like amount of the hydrocarbon starting material from which said condensation product is produced, and at least five viscosity index units greater than an equal amount of condensation product derived by sulfur condensing the hydrocarbon starting material alone.

6. A composition of matter produced by co-sulfur condensing a liquid petroleum fraction having an ebullioscopic molecular weight in excess of about 750, less than 50% aromatic carbon atoms and a bromine number less than 10, and pentaerythritol dioleate with sulfur at a temperature in excess of about 350° F. but below the temperature of decomposition for a time period requisite to produce a final co-condensed product having a viscosity of at least about 300 SUS at 210° F., effective in a concentration of about 10% by weight to increase the viscosity index of a 60 at 100 SUS standard base oil derived from a paraffinic crude source at least about ten viscosity index units greater than a like amount of the hydrocarbon starting material from which said condensation product is produced, and at least five viscosity index units greater than an equal amount of condensation product derived by sulfur condensing the hydrocarbon starting material alone.

References Cited

UNITED STATES PATENTS

| | | | |
|---|---|---|---|
| 1,367,428 | 2/1921 | Pressell | 252—48.6 |
| 1,689,011 | 10/1928 | Davis | 252—48.6 |
| 1,987,397 | 1/1935 | Gallsworthy | 252—48.2 |
| 2,220,843 | 11/1940 | Johnson | 252—48.6 |
| 3,036,004 | 5/1962 | Lawrence et al. | 252—48.6 |

DANIEL E. WYMAN, Primary Examiner

J. VAUGHN, Assistant Examiner

U.S. Cl. X.R.

252—45, 46.6, 56

UNITED STATES PATENT OFFICE
CERTIFICATE OF CORRECTION

Patent No. 3,455,830                                                    July 15, 1969

Franklin I. L. Lawrence et al.

It is certified that error appears in the above identified patent and that said Letters Patent are hereby corrected as shown below:

Column 1, line 55, after "$P_2S_5$" insert -- to --. Column 3, lines 74 and 75, "cmopositions" should read -- compositions --. Column 4, line 40, "raffnate" should read -- raffinate --. Columns 7 and 8, eighth column, lines 1 and 2 thereof, ".626" and ".613" should read -- .622 -- and -- .616 --. Column 10, line 33, "B" should read -- C --; line 35, "A and B" should read -- A, B and C --; line 54, "SECTION A" should read -- SECTIONS A AND B --; line 56, "section A" should read -- sections A and B --. Column 11, line 4, "improved" should read -- improver --; line 46, "invtntion" should read -- invention --.

Signed and sealed this 9th day of June 1970.

(SEAL)
Attest:

EDWARD M. FLETCHER, JR.                          WILLIAM E. SCHUYLER, JR.
Attesting Officer                                        Commissioner of Patents